United States Patent [19]

Doggett

[11] Patent Number: 4,672,400

[45] Date of Patent: Jun. 9, 1987

[54] ELECTROSTATIC PRINTING APPARATUS

[75] Inventor: David E. Doggett, Sunnyvale, Calif.

[73] Assignee: Synergy Computer Graphics Corporation, Sunnyvale, Calif.

[21] Appl. No.: 775,227

[22] Filed: Sep. 12, 1985

[51] Int. Cl.⁴ ............................................. G01D 15/14
[52] U.S. Cl. ..................................... 346/160; 346/155
[58] Field of Search ............... 346/160, 155, 107, 108; 400/119; 350/6.1–6.4, 6.91; 101/DIG. 3

[56] References Cited

U.S. PATENT DOCUMENTS 3,090,828  5/1963  Bain ..................................... 346/160
3,532,037  10/1970  Auphan ................................ 350/6.4

Primary Examiner—Arthur G. Evans
Attorney, Agent, or Firm—Limbach, Limbach & Sutton

[57] ABSTRACT

An electrostatic printing apparatus is disclosed having an improved optical scanner. The optical scanner is capable of directing a beam of radiation about a circular target zone. The scanner includes hollow shafted rotor having focusing and deflecting elements, rigidly mounted therein. The scanner can be readily adjusted to eliminate any timing errors.

14 Claims, 17 Drawing Figures

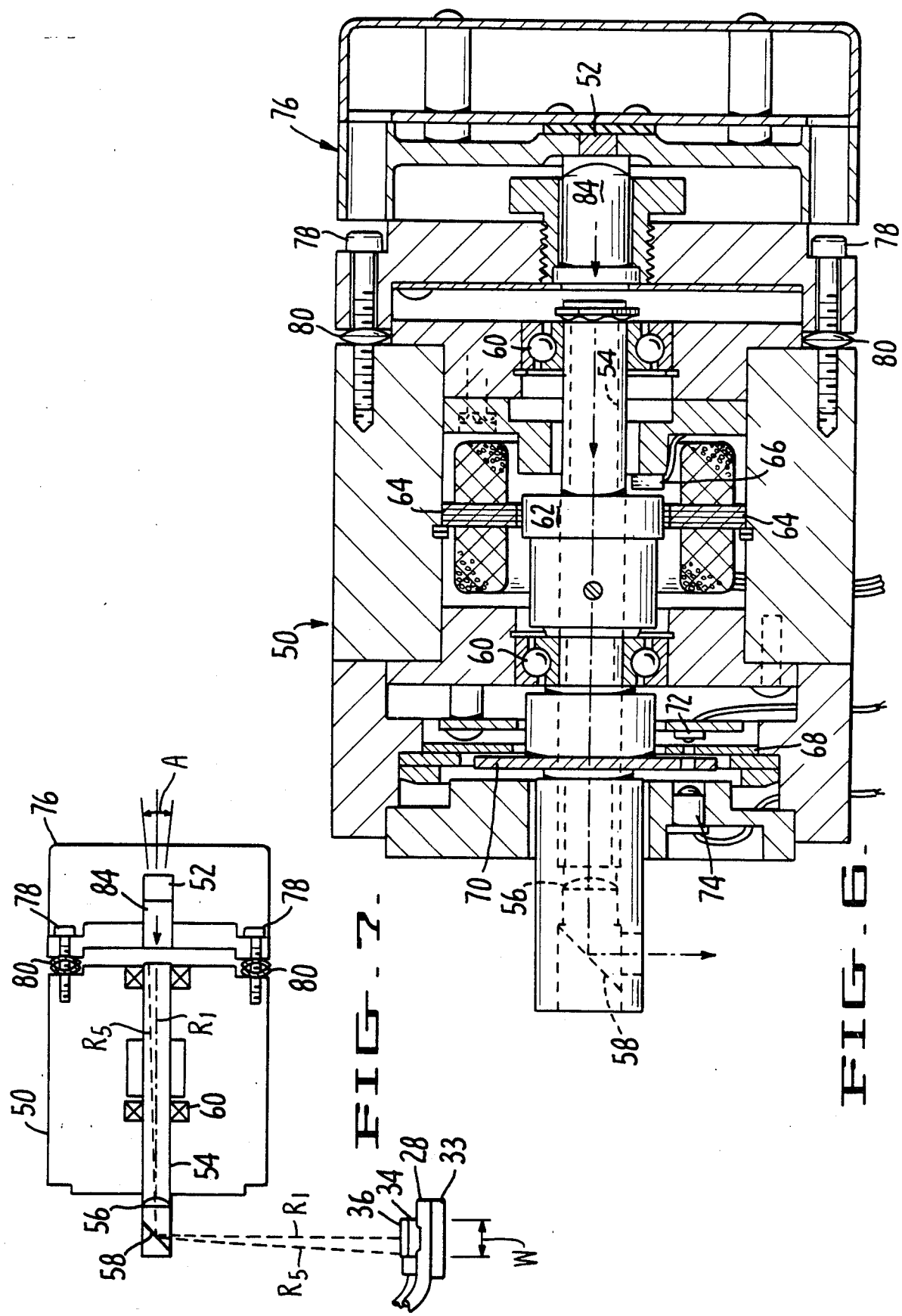

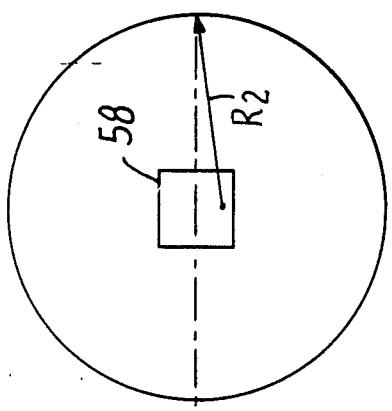
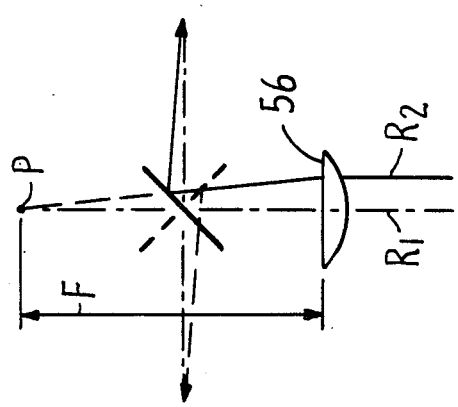
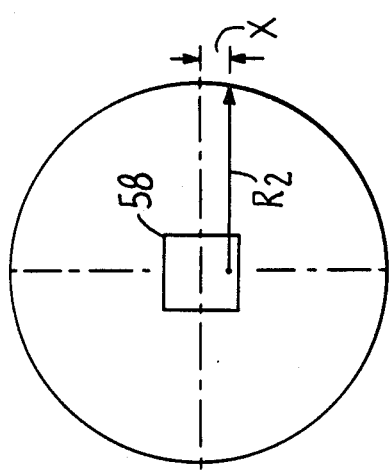
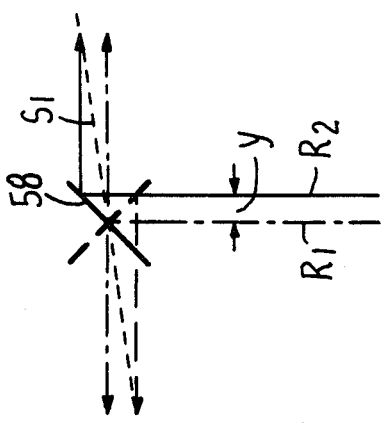
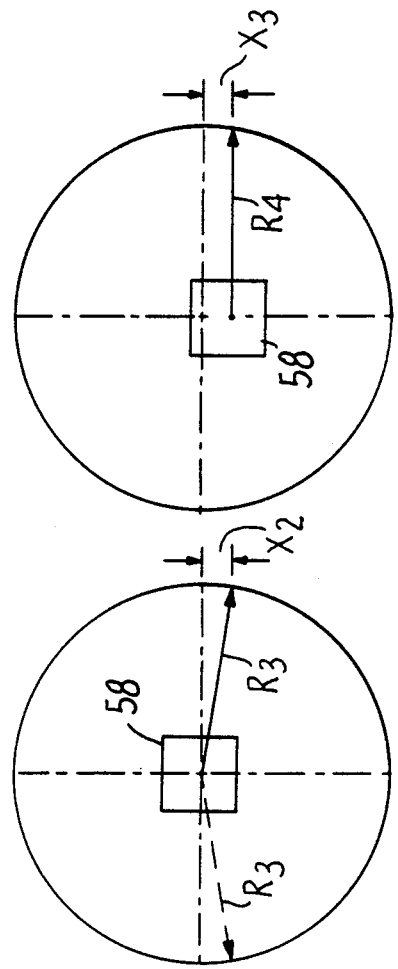
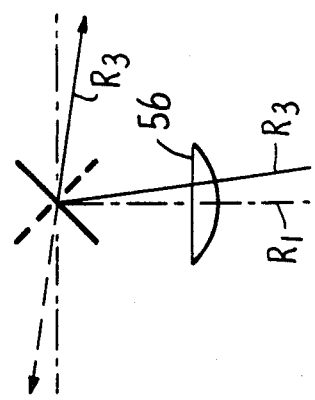

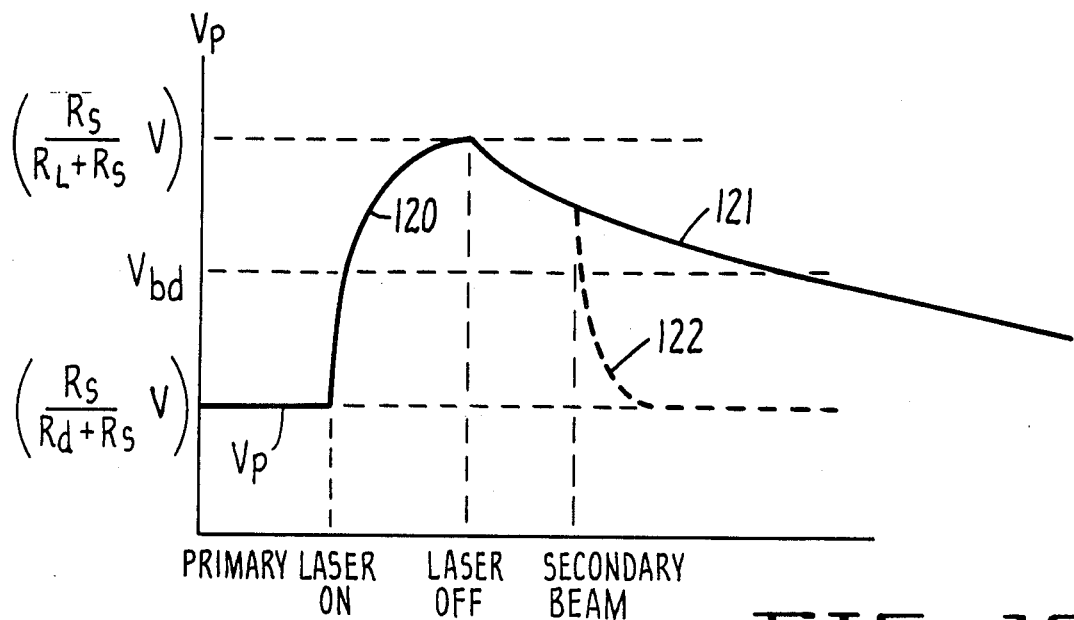
FIG. 10.
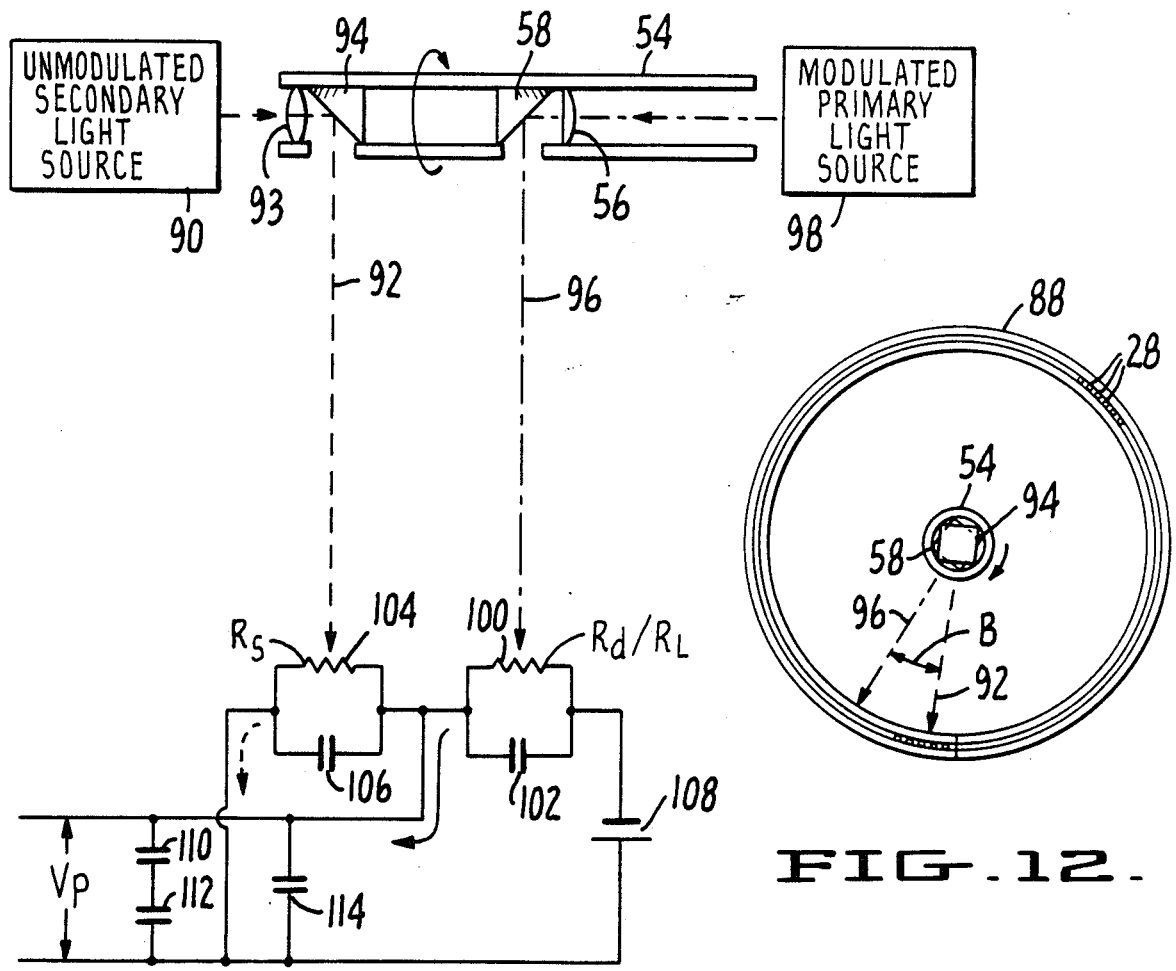
FIG. 12.
FIG. 11.

ELECTROSTATIC PRINTING APPARATUS

TECHNICAL FIELD

The subject invention relates to an electrostatic printer using a stylus writing head where the electrostatic potential necessary for writing is optically switched by use of a photoconductor and a scanning beam of radiant energy.

BACKGROUND OF THE INVENTION

In the past, significant efforts have been made to develop high resolution, high speed printing systems. Such efforts have resulted in high resolution devices but at high cost. Accordingly, efforts have been made to devise systems which can achieve a high resolution image, yet are low in cost to manufacture.

One technology which has been promising is high voltage electrostatic printing. In an electrostatic printing device, a write head having a plurality of stylii is positioned in spaced-apart relationship to a dielectric coated paper substrate. A voltage is applied to the write head sufficient to exceed a breakdown voltage of the air in the stylus to paper gap in order to ionize the air and deposit a charge on the dielectric surface of the paper. The paper is then passed by a toner station having oppositely charged ink particles, where it will pick up an image-wise pattern of toner in correspondence with the charges applied to the surface. The toner can then be fused to the surface of the recording medium by any one of several methods known in the art.

One method of obtaining high resolution, high speed printing via an electrostatic printing process is to use an array of conductive wires arranged in linear fashion across the width of the paper. With this approach, there is no need for complex mechanical structures to move the write head relative to the paper. Rather, it is simply necessary to move the paper past the write head in a direction orthogonal to the printhead.

One of the shortcomings with the latter approach is that it is quite difficult to provide a low cost system for addressing a high number of densely packed wires. In a typical high resolution printer, the wires are formed in an array of 400 wires per inch across the typical 36-inch width of the printhead such that over 14,000 wires will be addressed. Commercially available printers utilizing high-voltage electrostatic technology require several hundred expensive high voltage transistor drive circuits, together with a complex multiplexing scheme to accomplish reasonable resolution/speed performance.

Various other schemes have been proposed in the prior art for addressing the ends of the conductive writing elements or wires in an electrostatic printing process. In the mid-1950's, A. B. Dick Company began developing an electrostatic printing process where a cathode ray tube was used to sequentially address the ends of a wire matrix for transferring charge to a dielectric recording medium. In this device, called the Videograph, an electron beam was scanned over one end of the wires with the electrons being transferred along the wires through the front surface of the cathode ray tube and into a stylus array writing head. The charge was then deposited on dielectric paper by the process discussed previously. The Videograph proved to be a very successful device for printing mailing labels and the like, however, the cathode ray tube could not provide a low cost mechanism for large arrays.

The subject invention utilizes another method for supplying current to the wires coming from the write head. In the subject system, each wire is provided with a layer of a photoconductive material, whose resistance changes when addressed with a beam of radiation. This change in resistance can be used in an electrical circuit to provide a voltage at the write head.

Photoconductive materials have been used in electrostatic printing devices for some time. A high voltage electrostatic printing technology known in the art as simultaneous charge transfer has been used with photocopiers. A description of this type of device can be found in "Charge Transfer Electrophotography", Jepsen and Day, *Photographic Science and Engineering*, 1974. In this device, a glass substrate is coated with a transparent conductive layer. The transparent conductor is overlaid with a photoconductive layer. The substrate is held in a spaced-apart relationship to a sheet of dielectric coated paper. A voltage is applied to the conductive layer that would be sufficient to ionize the air gap between the photoconductive layer and the surface of the paper.

In operation, light is passed through a negative image to be copied, such as microfilm, and impinges on the photoconductive surface through the transparent conductive coating. In local areas where light strikes the photoconductor, resistivity of the photoconductive layer will drop, permitting the current in the conductive layer to raise the voltage at the photoconductor surface above the breakdown voltage such that an electric charge is deposited in image-wise fashion on the paper. The paper is then passed to a toner station where the image is developed.

As can be appreciated, the latter device was designed simply to make copies, that is, to take analog information on one media and transfer it to another media in analog form. Efforts were made to adapt this type of technology for converting digital data into printing. One such attempt was described in "Laser Recording on Dielectric-Coated Paper Using Simultaneous Charge Transfer", Day et al., Proceedings First European Electro Optics Markets and Technology Conference, Geneva, Switzerland, IPL Technology Press Ltd., p. 363, September 1972. In the device described in the latter article, a laser beam was directed inside a rotating glass drum having an outer photoconductive structure identical to the device discussed above. The laser was modulated with the digital data and scanned across the inner surface of the drum. While appearing feasible, these efforts proved too costly and no commercial product was ever released.

In the literature there are many examples of printers using photoconductors. For example, U.S. Pat. No. 2,898,468, issued Aug. 4, 1959 to McNaney, discloses a device which has a printhead adjacent the printing surface. A pair of electrodes are provided, one of which is connected to high voltage and the other to a writing stylus. These electrodes are separated by a photoconductor having high resistance in the dark. When this photoconductor is struck by an energy beam, its resistance is reduced, permitting current to pass between the two conductors in a manner to deposit a charge on the moving substrate.

There have been continuing efforts to develop electrostatic printers which utilize a combination of a printhead, defined by a plurality of wires, and a photoconductive excitation technique. Such a device is described in U.S. Pat. No. 3,689,933 to Klose. In this low voltage device, elements formed from a photoconductive material are arranged in a circular target zone. These elements are addressed using a laser beam and a laser beam modulator. More specifically, the laser beam is passed through an optical shutter and then to a beam deflector. This beam is scanned in conical fashion to address a photoconductor which is deposited in a circular format on a flat substrate. The plurality of wires extend radially from the scanned circle and are placed in direct contact with a dielectric drum onto which charge is deposited through a direct ohmic contact. The wires are energized with a low voltage circuit in a manner similar to the device disclosed in McNaney patent. This Klose device was also never commercialized.

The subject invention utilizes a similar method for supplying current to the wires coming from the write head. In the subject system, each wire is provided with a layer of a photoconductive material, whose resistance changes when addressed by a beam of radiation. This change in resistance is then used in an electrical circuit to provide a switched voltage on the stylus.

As can be seen in previous examples of prior art, laser scanners have been identified as useful devices for high density printing systems. A problem associated with designing a high density scanner is that misalignment of the optics can result in timing errors. More specifically, in order to transfer the charges to the correct location on the paper, the radiation beam must be focused on the proper photoconductive element at the proper time or the image will be displaced or otherwise distorted. Accordingly, it would be desirable to provide a new and improved optical scanner which can be used for high density printing and can be easily adjusted to remove timing errors.

Many attempts have been made to develop optical scanners which would satisfy the above requirements. These scanners usually employ the property of reflection to redirect a radiation beam to produce a scanned beam. The redirection is achieved by changing the angle between the plane of the reflective element and the incident radiation beam in a prescribed way. For example, the scanner can be arranged such that the axis of the incident energy beam and the rotational axis of the reflecting member are perpendicular. Devices which perform this function include motors mounted with a mirrored polygons, galvanometer drive assemblies with a mounted single mirror and resonant torsional assemblies also with a mounted single mirror.

These configurations require that the reflecting surface become longer in one dimension as the scan angle increases. The effect of this lengthening is generally to keep this class of scanners to scan angles of 90° or less. The corresponding angular excursion of the scanning mirror would be 45° which would result in the increase in and effective size of the mirror to 1.4 times that of the beam diameter. Where data is to be decoded from a motor shaft to give information about the angle at which the reflected radiation beam is being directed, the accuracy required is based on the complete rotation divided by the scans per revolution and further divided by the number of pixels or writing elements per scan. In these devices, a full scan is created with less than a full rotation of the scanning mirror, such that there is a high degree of pointing accuracy required. This problem is made worse by the double angle which is generated upon reflection.

One approach which has been taken to overcome the latter problems includes the development of circular scanners. In these devices, a mirror is attached to a motor shaft at 45° to the rotational axis of the motor. A radiation beam impinging upon the mirror will produce a scanning pattern that is generally conical, but usually nearly planar. If conical, these devices can scan a circle on a plane and if conical or planar they can scan a circumferential target zone on the inside of a cylinder or other geometric surface of revolutions. Examples of circular scanners can be found in U.S. Pat. No. 3,875,587, issued Apr. 1, 1975 to Pugsley, and U.S. Pat. No. 3,651,256, issued May 21, 1972 to Sherman et al. The subject invention provides an improved low cost circular scanner which is applicable to high resolution printing.

As discussed above, in many electrostatic printing systems, a photoconductive material is irradiated with a beam of energy such that the resistance of the material is reduced. The material is connected to a voltage source, such that the drop in resistance changes the current flow into an associated stylus, producing a voltage change in the stylus. This voltage will rise until it exceeds the breakdown voltage of the air layer between the writing stylus and the dielectric recording media. Once the voltage has increased above this breakdown level, charge will be deposited on the surface of the dielectric. The amount of charge placed on the paper will depend in part upon the length of time the light source is focused on the photoconductor. Once the laser is turned off, the resistance of the photoconductor will begin to rise, slowing the current flow into the wire, and eventually reducing the voltage at the gap below the breakdown level. Prior to that time, however, the circuit will still be conducting and depositing charge on the substrate.

In a similar fashion, some printers rely on direct ohmic contact of the wires to the dielectric recording media. In the latter case, charge is deposited at a much lower voltage as there is no layer of air that has to be ionized before charging will begin. In both cases, where dielectric coated paper is moving past the printhead, if the decay time of the photoconductor is too slow, the area of the deposited charges will elongate. When the image is toned, the contrast ratio will be reduced and the ink will appear smeared. Therefore, it is desirable to place some kind of control on the decay time of the photoconductive material.

An attempt at addressing this problem is disclosed in U.S. Pat. No. 3,466,657, issued Sept. 9, 1969, to Rice. Rice discloses a matrix printer including 5 by 7 wires each one of which was connected to a photoconductive driver. These wires would be energized in a simultaneous manner to form a character. A plurality of masks were provided, each mask having a particular printing pattern. A light source would be energized to illuminate individual masks to produce the desired characters.

Each mask in the Rice device was provided with a companion mask that exposed the complements of the wires of the first mask. The second mask includes a circuit where the wires were shunted to ground. Thus, each time the radiant energy is supplied, the wires for printing are energized and the wires which would not print are being discharged. This had the effect of ensuring that no residual charges built up on the wires. By reducing the residual charges, it was felt that the decay time could be minimized. Unfortunately, the Rice patent did not disclose a means for adjusting the rate of decay. Indeed, the device in Rice did not even affect the wires which were activated during the write cycle.

Therefore, it would be desirable to provide a device where the conductance of a second photoconductor, connected to the same writing stylii as the first photoconductor, could be controlled to effect the decay time of the activated wires as well as to control the voltage of the wires which have not previously printed.

Accordingly, it is an object of the subject invention to provide a new and improved electrostatic printing device.

It is another object of the subject invention to provide a new and improved optical scanner for an electrostatic printer.

It is a further object of the subject invention to provide an optical scanner which can be readily adjusted to remove timing errors.

It is another object of the subject invention to provide a new and improved electrostatic printer which can produce high resolution and print speed at low cost.

It is still a further object of the subject invention to provide a new and improved electrostatic printer where the write time of the stylii can be controlled while keeping the duty cycle of the scanner high.

SUMMARY OF THE INVENTION

In accordance with these and many other objects, one aspect of the subject invention relates to a new and improved optical scanner particularly suited for a high resolution, wide format electrostatic printing device. The specific electrostatic printing device disclosed herein includes a wire array having a circumferential or circular target zone which is scanned by a modulated radiation beam. The scanning device of the subject invention is capable of providing a highly accurate scan of this circular target zone. Beyond electrostatic printing, the subject scanner will find application in other devices where the scanning of a circular target zone is desired. For example, a planar substrate can be designed with a plurality of leads that terminate in a circular configuration. The optical scanner of the subject invention can be used to generate a conical scan for directing a radiation beam selectively at the circular locus of the conductive lines on the substrate.

In a preferred embodiment, the scanner is used with an electrostatic printer having an array of conductive writing elements. One end of the array is configured as a linear write head and in a manner to deposit electrical charges on a spaced-apart, dielectric substrate. The writing elements may themselves be arranged in a single linear array or in any other suitable format, such as a pair of spaced apart, parallel rows. The portion of the array opposed to the stylus end is arranged in a cylindrical configuration with the inner surface of the cylinder including a circumferential target zone. By this arrangement, the scanning does not have to address the ends of the wires but rather irradiates an area along the edge of each wire. This arrangement permits some flexibility in the tracking height of the beam which is taken advantage of in the subject invention to eliminate all timing errors.

In the preferred embodiment, the target zone includes a layer of photoconductive material in contact with individual wires or conductive writing elements of the stylus array. A conductive layer, transparent to the scanning beam of radiation used, is deposited over the photoconductive layer. The conductive layer is connected to a high voltage source. When a beam of radiation is directed to a particular writing element, the resistance of the photoconductive material associated therewith will drop, permitting current from the conductive layer to be transferred to the writing element. This, in turn, causes the voltage in that particular writing element to rise. When this voltage increases above the breakdown voltage of the air in the gap between the writing stylus and the dielectric-coated substrate, the air will be ionized and a charge will be deposited on the dielectric recording surface.

In order to irradiate the circumferential target zone, a circular scanner is provided. The circular scanner includes a radiation source for emitting a beam of collimated radiation directed along a path substantially axial to the target zone. A deflecting means is provided for deflecting the axially traveling radiation beam radially outwardly towards the circumferential target zone. A focusing means is placed in the beam in a manner to cause the beam to converge to a focus at the target zone. Finally, a means is provided for rotating both the deflecting means and the focusing means in a manner such that there is no relative motion between the two elements and the deflected radiation beam is scanned about the circular target zone. It is an important aspect of the subject invention that both the deflecting means and focusing means are rotated together, such that there is no relative motion therebetween. It is possible to combine the deflecting means and the focusing means into one optical element, such as an off-axis parabola or a holographic optical element, to achieve the desired result.

In the preferred embodiment, a lens and prism combination is mounted in a hollow shafted motor. A collimated laser source is mounted in a manner to direct the emitted beam of radiation along the axis of the hollow shaft. In addition, a means is provided for adjusting the angle of the axis of the emitted beam with respect to the axis of rotation of the hollow shaft. By adjusting the angle of the axis of the emitted beam with respect to the axis of rotation of the hollow shaft, timing errors induced by mechanical misalignment of the axis of the hollow shaft with respect to the axis of the circumferential target zone can be eliminated.

Another aspect of the subject invention relates to the control of the time period during which the voltage of the stylus exceeds the breakdown voltage of the air gap. As discussed above, when the photoconductive layer is excited by a beam of radiation, its localized resistance will drop, permitting current to flow into a particular writing element. Once the beam of radiation is shut off, current continues to flow until the resistance in the photoconductor rises to an amount sufficient to reduce the voltage below the breakdown level. If this time period is too slow, the charge pattern deposited on the substrate will spread, adversely affecting image quality.

This problem is controlled in the subject invention by providing a second target zone connected to each conductive writing element. The second target zone also includes a photoconductive layer and a discrete transparent conductive layer connected to a voltage different than the transparent conductive layer of the first target zone. In the preferred embodiment, the second transparent conductive layer is connected to ground.

In the dark, this second photoconductive layer has a high resistance value. However, when the second target zone is illuminated, the resistance of this photoconductive layer will be reduced and current will be shunted from the stylus to rapidly drop the voltage on the stylus below the breakdown voltage of the air gap. By controlling the time difference between illumination of the first target zone and illumination of the second target zone, the write time of the stylus can be adjusted.

This aspect of the subject invention, which includes a second target zone irradiated after the first target zone, can be implemented with a number of different types of scanners. For example, in the planar reflective scanners found in the prior art, two beams can be directed at a single deflector, at a different angle and height to provide sequential and vertically separated scanning of two target zones.

In the preferred embodiment of the subject invention, a second deflector, in this case a second prism deflector, is mounted coaxially to the rotational axis of the first prism deflector. An unmodulated light source is directed at the second deflector for exciting the second target zone and modifying the voltage level at the air gap. In order to control the time delay between the actuation of the first and second target zones, the reflecting surface of the second deflector is mounted at an angle, offset a fixed number of degrees from the reflecting surface of the first deflector. In this manner, the beam from the second light source is reflected parallel to, but trailing the first beam. The angular separation between the two reflecting surfaces can be adjusted to vary the amount of time delay between the two beams striking a given wire.

Further objects and advantages of the subject invention will become apparent from the following detailed description taken in conjunction with the drawings in which:

BRIEF DESCRIPTION OF THE DRAWINGS

FIG. 6 is a cross-sectional view of the optical scanner of the subject invention.

FIG. 7 is a simplified cross-sectional view of the optical scanner shown for illustrative purposes.

FIGS. 8A and 8B are schematic diagrams illustrating the translation displacement of the scanning beam with respect to the deflecting prism together with the attendent timing error and FIGS. 8C and 8D illustrate the correction of the problem achieved by the subject system.

FIGS. 9A and 9B illustrate the displacement and timing error produced when there is an angulation of the scanning beam with respect to the deflecting prism.

FIG. 9C illustrates the timing error produced when the scanner is displaced from the axial center of the circular target zone.

FIG. 10 is a timing diagram showing the voltage carried in the conductive writing elements during a write cycle.

FIG. 11 is a composite drawing illustrating the dual deflectors and secondary beam utilized to effect the decay time of the write cycle, and a schematic illustrating the accompanying electrical circuit.

FIG. 12 is a view illustrating the angular separation between the two deflectors to produce a delay between scans.

DETAILED DESCRIPTION OF THE PREFERRED EMBODIMENT

Figure 1:
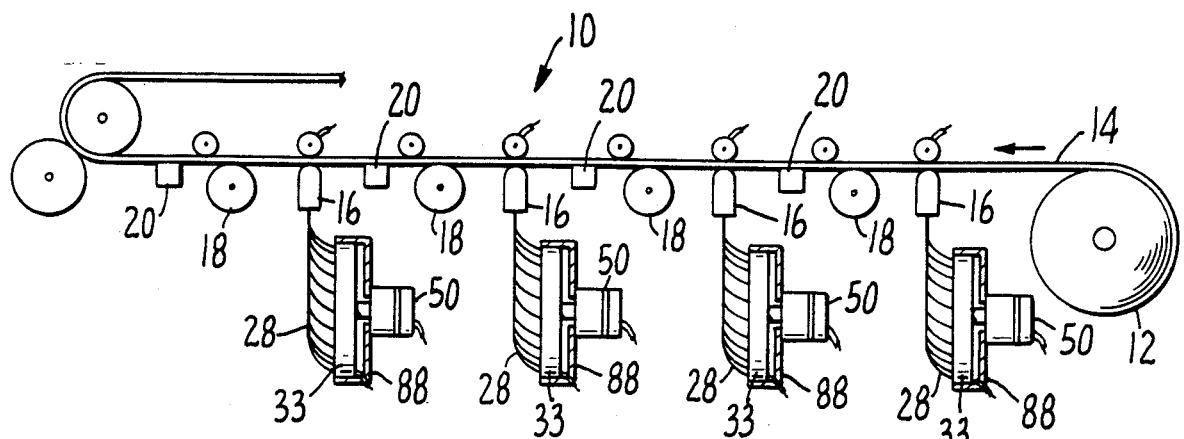
FIG. 1 is a schematic view illustrating a four-station color electrostatic printer incorporating the inventions of the subject disclosure.

Referring to FIG. 1, a schematic layout is shown of an electrostatic printer with four printing stations. The device 10 includes a supply roller 12 for feeding a dielectric substrate 14 past a series of print stations. The dielectric substrate consists of a conductive paper having a thin coating of plastic to define a dielectric. In addition, particles, such as aluminum oxide, can be added as an abrasive to help define an air gap between a write head and the substrate.

Figure 2:
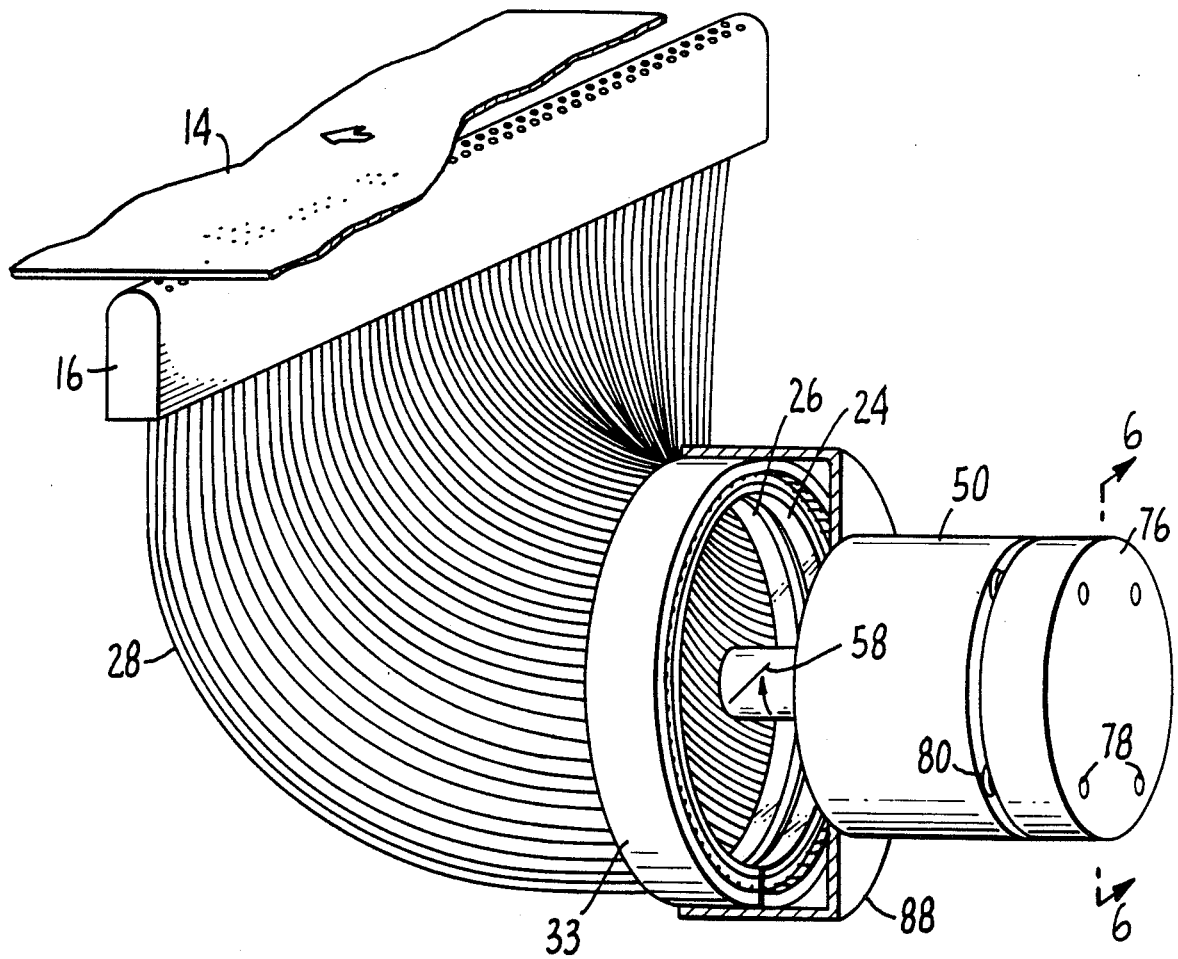
FIG. 2 is a perspective view showing the array of conductive writing elements and the optical scanner of the subject invention.

As illustrated in FIG. 1, each print station includes a write head 16. As seen in FIG. 2, the write head 16 includes an array of conductive elements or wire stylii 28 arranged in a linear configuration. In the preferred embodiment, the print head 16 has 400 wires per inch arranged in two, spaced apart, parallel rows. A single 36 inch write head will have 14,400 wires which must be individually addressed. The subject scanner which will be discussed in more detail below provides a means for accurately addressing each of those 14,400 wires at relatively high speed.

As is well known in the electrostatic printing art, the head will function to deposit charges on the surface of the moving substrate. The substrate 14 will then be moved past a toner station 18 where it picks up charged ink particles. The substrate is then passed by a fixing station 20, where the ink particles are fused to the paper.

In the embodiment illustrated in FIG. 1, there are four printing stations, each designed to print one of four primary colors. The use of composite colors to give a range of hues is known in the prior art. One of the difficulties in developing color printers heretofore has been the fact that the printheads and scanners were prohibitively expensive. The subject invention allows the construction of a low cost printing unit, such that a four-stage device is economically feasible.

Figure 5:
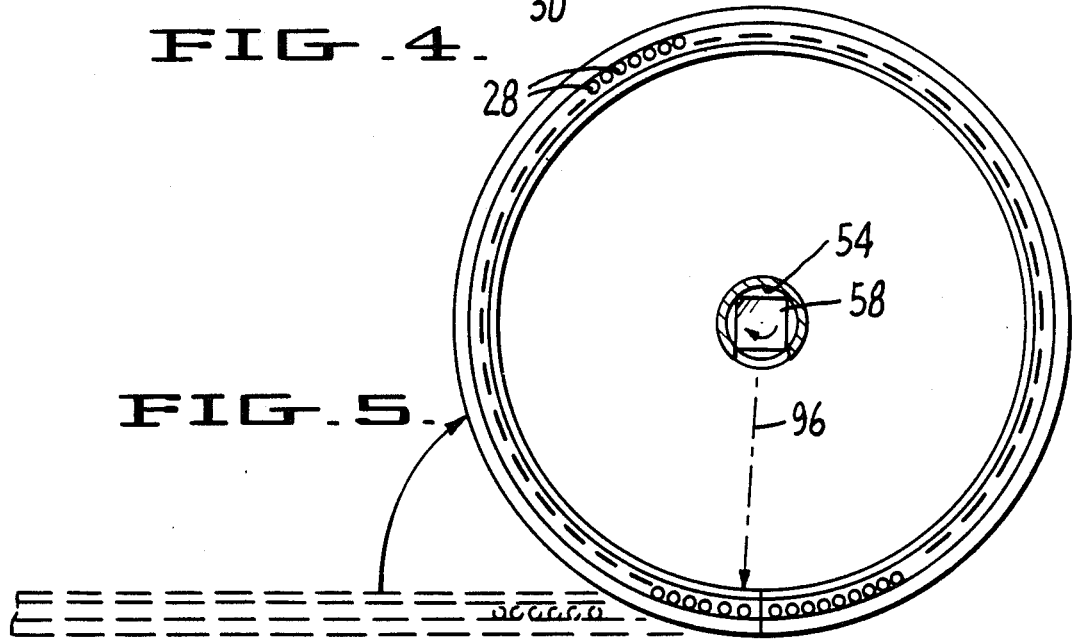
FIG. 5 is a developmental view illustrating the construction of the cylindrical end of the wire array from a linear array.

In the preferred embodiment of the subject invention, the free end of the linear array of wires is shaped into a cylindrical configuration. This approach is shown in FIG. 2 and in the development view of FIG. 5, where the linear array is shown wrapped about a central axis. The target area is then formed circumferentially about the inner surface of the cylinder. In many of the prior art devices, the ends of the wires were addressed. As will be seen below, in this embodiment, the target area can be laid out along the side surfaces of the wires which allows more flexibility in designing the scanner.

Figure 3:
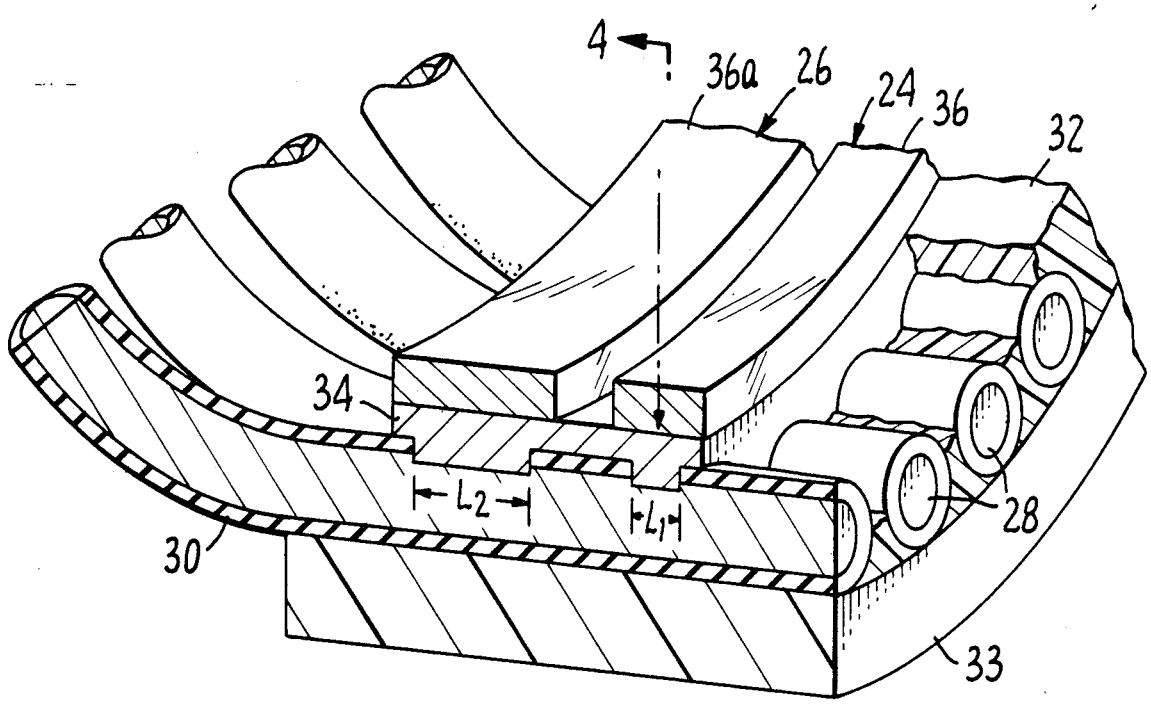
FIG. 3 is an enlarged perspective view, partially sectioned, of the array of conductive writing elements illustrating the first and second target zones.
Figure 4:
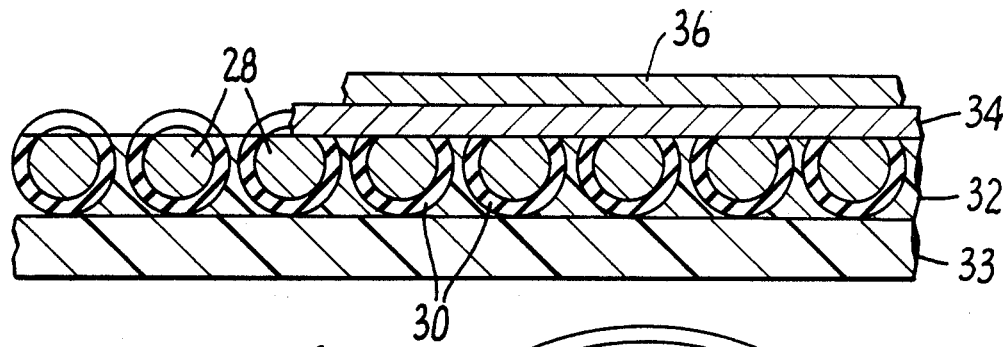
FIG. 4 is a cross-sectional view taken along the lines 4—4 of FIG. 3.

Referring to FIGS. 3 and 4, the assembly of the target zones 24 and 26 will be described in greater detail. Initially, the conductive writing elements or wires 28 are insulated with a polymeric coating 30 and formed into a linear array. The wires are embedded in an adhesive, insulating matrix 32 and mounted on a flexible support member or shim 33. A suitable shim can be formed from Kapton. In the illustrated embodiment, each conductive wire 28 has a radius of about 40–80 microns.

The next step in forming a target zone is to selectively remove the insulating layer from one side of the wires in an area which runs the length of the scanned wire array and is limited in width. It will be noted that FIG. 3 illustrates two target zones, 24 and 26. The two target zones are provided to permit the use of a second illuminating beam to control the decay time in the write cycle. It will be understood, of course, that if the latter feature is not desired, only a single target zone need be formed. Additional details concerning the second target zone 26 will be discussed with reference to that aspect of the subject invention.

The insulation surrounding the wires may be removed by lapping or grinding which will provide a planar surface for the deposit of a photoconductive layer 34. If it is desired to have a contoured surface, other removal techniques, such as laser or abrasive particle machining can be utilized which provides more selective removal of material. In any case, a portion of the bare wire must be exposed.

The bare wires at the scanned end of the stylus array are then coated with a photoconductive material 34 having a thickness on the order of 40 microns. The photoconductive material is preferably an amorphous semiconductor, such as hydrogenated silicon. This material has the characteristic that its electrical resistance will diminish when subjected to radiation. The material may be deposited on the wire with the glow discharge process.

Since each of the wires is selectively addressed with a highly focused laser source, the photoconductive layer may be continuous about the circumference of the target zone. Stated differently, the photons which are directed to the wire will only reduce the resistivity of the material in the area upon which the photons strike. For this reason, the photoconductive layer can also extend between the first and second target zones.

As can be appreciated, difficulties are often encountered in most etching and depositing techniques. Therefore, to increase the yield of usable devices, it is suggested that the target zones be made redundant, wherein duplicate, triplicate or more zones are formed. Since any number of zones can be formed during the same steps, if there is a broken pattern in a particular zone, another zone would be available for use.

After the photoconductive layer 34 has been deposited, each zone is provided with a discrete conductive layer 36. The conductive layer is relatively thin, on the order of 1,000 angstroms. The conductive layer must be transparent to the radiation of the actuating radiation beam. In the preferred embodiment, the conductive layer is formed from a composite indium oxide and tin oxide material. Other conductors, such as gold or silver can be used because they are transparent when relatively thin. The conductive material can be laid down with a vacuum deposition technique or by sputtering. Where two target zones are used, each conductive layer is connected to a different voltage, such that the layers 36 and 36A must be discrete.

As discussed in greater detail below, when a beam of radiation is focused on the target zone associated with a particular wire, the resistance of the photoconductive layer will drop, permitting current to flow in the wire. Printing is accomplished by selectively energizing various ones of the conductive wires as the substrate moves by the printhead. Accordingly, a scanner must be provided for selectively addressing the wires during the print operation. The concept of selectively addressing wires by a modulated laser beam is known in the prior art, as discussed in the background section of this specification. The subject invention provides a new and improved optical scanner which when used in conjunction with a cylindrical target provides a highly accurate and adjustable system for addressing the wires.

Referring now to FIGS. 6 and 7, the optical scanner is shown in greater detail. In the preferred embodiment, the scanner includes a housing 50 for supporting a hollow shafted motor. A semiconductor diode laser 52 is mounted in a manner to pass a collimated beam of radiation through the shaft 54 of the motor. Mounted in the shaft is a means for focusing and deflecting the light towards the target zone. In the illustrated embodiment, the beam is focused with a lens 56 and deflected by a prism 58. In the preferred embodiment, the prism 58 is a cube prism with the diagonal interface coated to be a total reflector. The lens and prism are mounted together, such that there is no relative motion therebetween. This combination defines a short focal length scanner. The deflecting element could also be a mirror or a defraction grating. It would also be possible to combine the focusing and deflecting elements in a single physical structure, for example, by using a holographic optical element lens or an off-axis parabolic mirror.

As illustrated in FIG. 6, the hollow shaft 54 of the motor turns in bearings 60. A rotor 62 is mounted on the shaft and turns within a stator 64. Rough position sensing of the motor is provided by Hall effect switches 66. Specific position information is provided by a pair of tachometer discs 68 and 70 mounted between opposed diodes 72, 74. Disc 68 is held stationary and disc 70 rotates with shaft 54. These discs are used to track the location of the prism in a feedback circuit to permit accurate actuation of the laser when addressing the wires.

Laser 52 is mounted in a base 76 which is, in turn, connected to the main body 50 of the motor assembly. The mounting of the base is accomplished through screws 78, which pass through Bellville washers 80. The Bellville washers are compressible, such that by tightening various ones of screws 78, the angle of the base 76 with respect to the main housing 50 can be adjusted. This adjustment permits the axial direction of the radiation beam to be varied within the hollow shaft. A collecting lens 84 is rigidly attached to the base structure and placed so that the output of laser 52 is highly collimated and directed into and substantially parallel to the rotational axis of shaft 54.

As illustrated in FIG. 2, the housing 50 is mounted to a cylindrical bracket 88. The cylindrical bracket is designed to receive the cylindrical end of the array of wires in such a way that axis of rotation of the motor shaft coincides nearly with the axis of the cylindrical array. The wires may extend about the entire 360° circumference of the bracket or have some gap between the beginning and end of the array. Preferably, the optical center of the output face of the prism 58 is mounted to be relatively coplanar with the first target zone. In practice, it is quite difficult to get an absolutely planar scan and some form of conical scan will be produced. The position of the outer bracket 88 can be adjusted relative to the cylindrical target zone to compensate for any deviation.

As mentioned above, the lens 56 is rigidly mounted with respect to the reflecting prism 58. Furthermore, the system is arranged such that the focal distance of the lens is equal to the optical distance between the lens and the target zone. Since the distance between the lens and the target zone remains substantially constant about the circular scan, the beam is always focused on the target zone. An advantage of this arrangement is that any translational errors of the collimated radiation beam with respect to the lens are compensated for by the properties of the lens itself. This compensation results from the property that parallel light entering a convex, spherically correcting lens at any transverse location converges at the single focal point of that lens.

This result can be better appreciated with reference to FIGS. 8A through 8D. FIGS. 8A and 8B illustrate two views of a scanning system wherein the scanning beam is laterally displaced to produce a translational error. More specifically, and as illustrated by FIG. 8A, a light ray $R_1$ is shown properly directed to the center of the rotating reflector 58. In this situation, a circular scan $S_1$ is produced in a horizontal plane. Light ray $R_2$ is shown displaced a distance y from ray $R_1$. This displacement results in a tilted scan being produced as the deflector is rotated about 360°. The tilted scan is indicated by line $S_2$.

FIG. 8B is a view along the axis of the scanner. Ray $R_2$ is shown displaced from the center of the reflector 58. This error results in ray $R_2$ being displaced a distance x from its proper location on the photoconductive array. This situation produces a timing error. As discussed above, each selective wire must be addressed at precisely the right time by the modulated laser beam in order to write accurate information. In the illustration of FIG. 8B, the beam will be striking the wrong wire when it is energized, resulting in a printing error.

As stated above, in the subject invention, translational errors of the beam with respect to the deflecting member 58 are corrected by the combination of the collimated beam and the focusing lens 56. This correction is schematically suggested in FIG. 8C, where all the collimated light that passes through lens 56 will become focused at a point P a distance F from the lens if a deflector was not present. The deflector merely changes the path of the light beams. Thus, as long as the distance from the lens to the circular target zone is equal to the focal length of the lens F, all parallel light entering the lens will converge and focus on the target zone. This effect is also shown from the axial view of FIG. 8D. Furthermore, if the optical axis of the focusing lens 56 is not coincident with the rotational axis of the scanning motor, the resulting deflected beam will be displaced in height on the target zone. This height displacement is acceptable and will not produce any timing errors.

There are two other alignment errors which can affect the performance of the system. The first error is where the radiation beam is disposed at an angle with respect to the rotational axis of the shaft. This angulation error is shown by light ray $R_3$ in FIG. 9A and will result in both a tilt error and a timing error. The timing error is shown as $x_2$ in FIG. 9B. The second alignment error relates to the situation where the shaft of the motor is displaced from the center of the circular target zone. This situation is illustrated in FIG. 9C by light ray $R_4$. The latter misalignment will produce a timing error (shown as $x_3$) similar in nature to the timing error caused by the angulation of the beam with respect to the shaft shown in FIG. 9B.

The tilting or angulation of the plane of the scan provided by angulation of the beam with respect to the axis of target zone can be readily tolerated in the subject invention. More specifically, and as shown in FIG. 7, the circular target zone 36 has a linear width W, such that errors in the vertical position of the beam with respect to the target zone can be accommodated. Light ray $R_5$ is shown displaced at an angle with respect to the properly aligned light ray $R_1$. Ray $R_5$ will be reflected by deflector 58 to a position spaced vertically from the proper position on the photoconductive target zone. Because of the linear extent W of the target zone, the wire will still be activated.

As pointed out above, the angulation of the beam will also result in timing errors as shown in FIG. 9B. In addition, any displacement of the scanner with respect to the center of the target zone will also produce timing errors as shown in FIG. 9C. These two timing errors are of the same type and are additive. The timing errors produced by either of the latter two misalignment situations can be corrected by adjusting the angle of the laser and hence the laser beam with respect to the shaft. The angle of the laser and the beam it emits are adjusted by varying the compression of the Bellville washers 80 through rotation of screws 78. By using an oscilloscope, an adjustment is made to vary the angle of the base 76 with respect to the housing as indicated by arrows A in FIG. 7. This adjustment, of course, will affect the errors in height or vertical position of the beam. However, as discussed above, the system can tolerate these height errors because of the extent W of the target zone.

Many of the benefits of the subject invention can be achieved even if a hollow shafted motor is not used. More specifically, the lens and prism assembly can be mounted together on the shaft of a motor. The modulated laser beam could then be mounted opposite the motor for directing a light beam onto the assembly. The use of a hollow shafted motor is preferred since it allows for a more compact construction and facilitates adjustment. In addition, this arrangement allows for a second light source to be readily utilized to effect the decay time of the write cycle.

It is envisioned that the optical scanner of the subject invention could find use in devices beyond electrostatic printing. Furthermore, it should be understood that the scanner is not limited to cylindrical target zones but can also scan a circular target zone. For example, a conical scanning pattern may be arranged to intersect with a planar target to define a circular target zone. Thus, the arrangement shown in the patent to Klose, Pat. No. 3,689,933, cited above, could be scanned by the subject invention.

When a conductive element or wire in the target zone is excited, the resistance in the photoconductive layer is reduced, such that current from the conductive layer can be supplied to the write head. When the voltage exceeds the breakdown voltage, an electric charge will be supplied to the substrate. After the laser is shut off, (or is moved away from the conductive wire) the voltage in the wire will decay until it is below the breakdown level and no more charges will be deposited on the substrate. The length of time (rise time) which it takes the voltage to build above the breakdown level is based primarily on the decreasing resistance of the photoconductive layer (when illuminated) and the capacitance of the wire array. When the beam is shut off, the time it takes for the voltage to drop down below the breakdown level (decay time) is a function of the capacitance of the wire array and the increasing resistance of the photoconductive layer.

It has been known in the prior art that by providing a shunt resistor in association with the circuit, the standing voltage in the wire could be kept low when the photoconductor was not excited. In the subject invention, the concept of a shunt resistor is expanded in a manner to positively alter the decay time during a write cycle.

This approach is achieved by providing a second target zone on the wires, as illustrated in FIG. 3. The second target zone 26 runs parallel to, but spaced apart from, target zone 24. Target zone 26 includes a second, discrete conductive layer 36A connected to a different voltage than the first conductive layer 36. In the preferred embodiment, the conductive layer 36A of the second target zone is connected to ground.

As illustrated in FIG. 11, the means for actuating the second target zone consists of a secondary radiation source or light probe 90 emitting a unmodulated beam 92. Beam 92 is focused by a lens 93 and deflected radially outwardly by reflecting prism 94. In the preferred embodiment, the second reflecting prism 94 is mounted coaxially with the first prism and on the same shaft 54. As illustrated in FIG. 12, the reflecting face of the second prism is offset from the reflecting face of the first prism by an angle B. Since the prisms are coaxially mounted on the rotatable shaft, the angular difference will result in beam 92 scanning the target zone at some finite time period after the beam 96 from modulated primary light source 98 scans the first target zone. The actuation of the second target zone will function to shunt current from the conductive stylus thereby shortening the write cycle. The magnitude of angle A will control the time delay before the shunt resistor is activated, such that the write time can be easily adjusted.

The operation of the device can be better understood by referring to FIGS. 10 and 11. More specifically, resistor 100 and capacitor 102 represent the electrical characteristics of the photoconductive layer in the first target zone. Resistor 100 is shown as $R_d/R_1$ which represents the resistance of the photoconductive layer when dark and when irradiated, respectively. Resistor 104 and capacitor 106 represent the electrical characteristics of the photoconductive layer in the second target zone. Resistor 104 is defined as $R_s$ or the shunt resistor. A voltage source 108 is provided to supply current to conductive layer 36. $V_p$ represents the voltage across the printing head to the underlying substrate. This consists of the capacitance 110 defined by the air gap between the substrate and the write head and the capacitance of the substrate itself, 112. Capacitor 114 represents the capacitance of the wire array which effects the decay time of voltage across the air gap.

Referring to the FIG. 10, the voltage drop $V_p$ across a single stylus, is plotted with respect to time as it is scanned by a radiation beam. In the off state, some current will pass through the photoconductive layer of the first target zone to create a voltage $V_p = [R_s/(R_d + R_s)]V$, where V is the applied voltage from the source 108. In the preferred embodiment, $R_d$, the resistance of the first photoconductive layer in the dark is set at approximately $10^9$ ohms. The resistance of this layer when irradiated, $R_1$ is intended to be about $10^5$ ohms. $R_s$, the resistance of the shunt resistor (when dark) should be set at approximately the geometric mean between $R_d$ and $R_1$.

When the reflecting means is directed at a particular stylii or wire 28, and it is desired to energize that wire to enable printing, then a signal is sent to modulated radiation source 98 such that a beam of radiation 96 is emitted. As the beam strikes a localized area on photoconductor 34, the resistance between the stylus and the transparent conductive coating is reduced, causing the voltage $V_p$ to rise to a level$[R_s/(R_{1+})]V$, as shown by curve 120 in FIG. 10. At some point during this rise, $V_p$ will exceed the breakdown level ($V_{bd}$) of air. The air in the gap will ionize and charges will be deposited on the recording media.

Once the laser is turned off, the resistance in the photoconductive layer will begin to rise. The voltage $V_p$ will begin to decay as shown by curve 121 in FIG. 10. At some time thereafter, the voltage will drop below the breakdown level ($V_{bd}$) and writing will stop. The voltage will eventually return to the off condition. For best print contrast, the voltage $V_p$ will have remained above $V_{bd}$ for approximately 100 microseconds but not longer than one-tenth the scan time, to achieve good image quality with no pixel elongation.

The slope of curve 121, or the time it takes to return to the off condition, is defined by the shunt resistance $R_s$ and the shunt capacitance $C_s$. The shunt capacitance is the series-parallel combinations of capacitors 106, 110, 112 and 114. As seen in FIG. 11, resistor 104 ($R_s$) is connected to ground and acts as a voltage divider in the circuit. Thus, if one wanted to effect the decay time, either the shunt resistance or the shunt capacitance could be modified. As stated above, the shunt capacitance comes from the configuration of the wires in the array and is difficult to modify.

In the subject invention, the shunt resistance is modified after the writing beam 96 has been moved off the subject stylus. As described above, a second radiation beam is scanned over the second target zone, a finite period after the first zone was activated. This procedure functions to rapidly drop $R_s$ (from about $10^7$ ohms to somewhere in the range of $10^5$–$10^6$ ohms), thereby shortening the decay time, as illustrated by curve 122 in FIG. 10. This change will ensure that the charges are deposited on the substrate only where desired, such that a higher contrast ratio can be maintained. By controlling the resistance of the first and second target zones, a write time of 100 microseconds can be achieved.

The relative resistance of the first and second target zones can be regulated to some degree by controlling the length of the photoconductive layer in contact with the wires. As illustrated in FIG. 3, the length $L_1$ in the first target zone is approximately half the size of the length $L_2$ of the photoconductive layer in the second target zone. Since resistance in this configuration is a linear function of length, the desired value of dark resistance can be effected by adjusting the relative length of the respective layers.

In the illustrated embodiment, the rotatable shaft 54 of the scanner is intended to rotate at 12,000 rpm to produce 200 scan lines per second. In this case, it has been found desirable to set angle B at about 7.2°. It should be understood that the tracking of the second beam can be accomplished using a second scanner motor, however, it is believed the illustrated embodiment may be the most efficient implementation.

The concept of irradiating a first and second target zone to control the decay time can be expanded beyond the circular scanner illustrated in FIGS. 11 and 12. More specifically, in a linear or curved scanner, for example, one with a rotating polygon or single mirror or an oscillating galvanometer, a second beam can be provided and aimed on the same horizontal location on the facet but at a different angle, in the plane of the movement of the scanner, such that the second beam lags behind the first in the manner described above. In order for the two beams to strike different target zones in an embodiment not utilizing a circular scanner, it is necessary for the two beams to be separated vertically on the scanning facet so that the locus of the two scans will be parallel but separated in space. The latter case, of course, describes the situation where the beams are directed perpendicularly to, and not coaxial with, the axis of rotation of the deflecting member as shown in FIGS. 11 and 12.

One advantage of the subject invention is that the secondary unmodulated beam 92 does not have to be as accurately directed as the primary modulated beam. Since the effort is only to more sharply define the printing, small timing errors will only affect the size of the pixel and cannot be readily perceived. In contrast, timing errors in the first scanning beam result in the write cycle being initiated at the wrong place on the substrate, an unacceptable situation.

Another advantage of the subject invention is that the secondary beam 92 need not be highly focused. Indeed, the beam can overlap on one or more conductive elements at any one time. Accordingly, the source of radiation for the beam can come from an extended source such as a light emitting diode or incandescent bulb. It should be noted that since the secondary light source 90 is on constantly, all of the wires in the array will be shunted during each revolution of the scanner. This arrangement will result in a drop in the standing voltage $V_p$ for any wires which have not been activated during that pass. However, the standing voltage $V_p$ will build back up again during the time the prism sweeps through a full cycle to return again to the value $[R_s/(R_1+R_s)]V$ for a given wire in the array.

In summary, there has been provided a new and improved optical scanner particularly adapted for use with an electrostatic printing apparatus. The optical scanner is designed to rotate a beam of radiation about 360° to address a circular target zone. The optical scanner is arranged such that it can be readily adjusted to eliminate timing errors. In another aspect of the subject invention, a second target zone is provided which can be actuated by a second beam of radiation. By regulating the time period between the actuation of the first and second target zones, the write time can be controlled.

While the subject invention has been described with reference to a preferred embodiment, various other changes and modifications could be made therein by one skilled in the art without varying from the scope and spirit of the subject invention as defined by the appended claims.

I claim:

1. An apparatus for optically scanning a surface having a circular target zone comprising:
    a radiation source for emitting a beam of collimated radiation directed along a path axial to the circular target zone;
    deflecting means for redirecting the axially traveling radiation beam radially outwardly towards the circular target zone;
    focusing means positioned to focus the radiation beam on the target zone; and
    means for rotating said deflecting means and said focusing means in a manner such that the redirected radiation beam is scanned about the circular target zone and with said deflecting means and focusing means being mounted such tht there is no relative motion therebetween.

2. An apparatus as recited in claim 1, wherein said focusing means is defined by a lens.

3. An apparatus as recited in claim 1, wherein said reflecting means is defined by a plane deflecting surface embedded in a cube prism.

4. An apparatus as recited in claim 1, further including a means for adjusting the angle of the radiation beam with respect to the axis of rotation of the focusing and deflecting means combination to eliminate any timing errors in the scanning of the radiation beam.

5. An apparatus as recited in claim 4, wherein said rotation means includes a hollow shafted motor to which said focusing and deflecting means are mounted and with said radiation source being mounted in a manner to pass the radiation beam within the hollow shaft.

6. An apparatus as recited in claim 5, wherein said radiation source is adjustably mounted to said hollow shafted motor.

7. An apparatus as recited in claim 1, wherein said radiation source is defined by a semiconductor diode laser in combination with a collimating lens.

8. An optical scanner for an electrostatic printer comprising:
    an array of elongated conductive writing elements with one end of the array configured linearly and in a manner to deposit electrical charges on a substrate and with the opposed end of said array being formed into a cylindrical configuration, with the inner surface of said cylinder including a circumferential area defining a target zone, with said target zone including a means capable of passing current to said wires when excited by a beam of radiation;
    radiation source for emitting a beam of collimated radiation directed along a path axial to the target zone;
    deflecting means for redirecting the axially traveling radiation beam radially outwardly towards the circular target zone;
    focusing means positioned to focus the radiation beam on the target zone and to form a spot on the target zone having a diameter less than the linear width of the target zone; and
    means for rotating said deflecting means and said focusing means in a manner such that the redirected radiation beam is scanned about the circumferential target zone and with said deflecting means and said focusing means being mounted such that there is no relative motion therebetween.

9. A scanner as recited in claim 8, wherein said focusing means is defined by a lens.

10. A scanner as recited in claim 8, wherein said deflecting means is defined by a plane reflecting surface embedded in a cube prism.

11. A scanner as recited in claim 8, further including a means for adjusting the angle of the radiation beam with respect to the axis of rotation of the focusing and deflecting means combination to eliminate any tim:ng errors in the scanning of the radiation beam.

12. A scanner as recited in claim 11, wherein said rotation means includes a hollow shafted motor to which said focusing and deflecting means are mounted and with said radiation source being mounted in a manner to pass the radiation beam within the hollow shaft.

13. A scanner as recited in claim 12, wherein said radiation source is adjustably mounted to said hollow shafted motor.

14. A scanner as recited in claim 8, wherein said radiation source is defined by a semiconductor diode laser in combination with a collimating lens.

* * * * *